United States Patent [19]

Mitchell

[11] 3,997,275
[45] Dec. 14, 1976

[54] FORCE TRANSMITTING CONNECTION
[75] Inventor: Roger R. Mitchell, Joliet, Ill.
[73] Assignee: Caterpillar Tractor Co., Peoria, Ill.
[22] Filed: Mar. 25, 1976
[21] Appl. No.: 670,308
[52] U.S. Cl. .................................. 403/14; 403/154; 280/477; 280/504; 403/315
[51] Int. Cl.² ........................................ F16C 11/00
[58] Field of Search ............ 403/14, 150, 151, 152, 403/154, 155, 157, 158, 315, 316, 317; 280/477, 481, 504

[56] References Cited
UNITED STATES PATENTS

| 873,561 | 12/1907 | Langer | 403/157 |
|---|---|---|---|
| 3,434,738 | 3/1969 | Campbell et al. | 280/481 X |
| 3,543,863 | 12/1970 | Ball | 403/152 |

Primary Examiner—Andrew V. Kundrat
Attorney, Agent, or Firm—John W. Grant

[57] ABSTRACT

A force transmitting connection for interconnecting a pair of members to transmit force therebetween includes a pair of spaced apart brackets secured to one of the members and disposed on opposite sides of the other member with each of the brackets having an open-ended substantially U-shaped slot formed therein. A force transmitting device is connected to and projects outwardly from the other member and is nested within the U-shaped slots. A retainer apparatus bridges the space between the brackets and is removably secured to the brackets and has a pair of spaced projections which are disposed on opposite sides of the other member and extend into the slot embracing the force transmitting device to retain the force transmitting device within the slots.

6 Claims, 3 Drawing Figures

U.S. Patent      Dec. 14, 1976      3,997,275
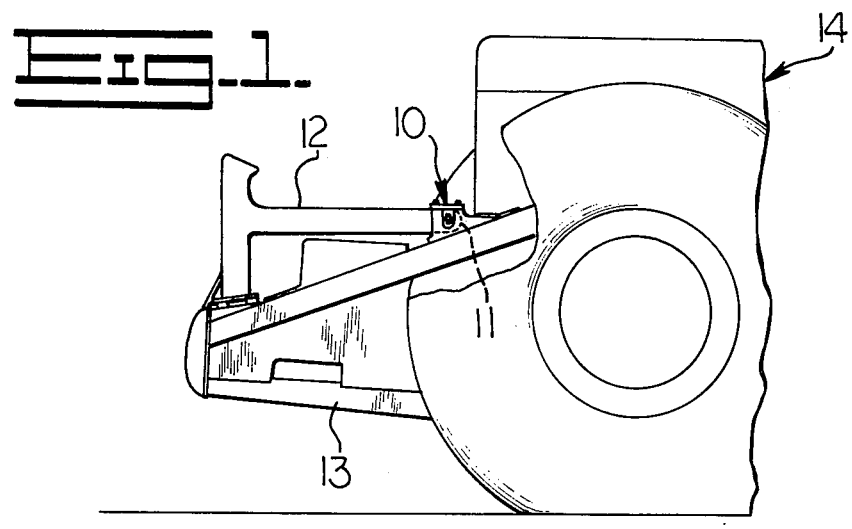
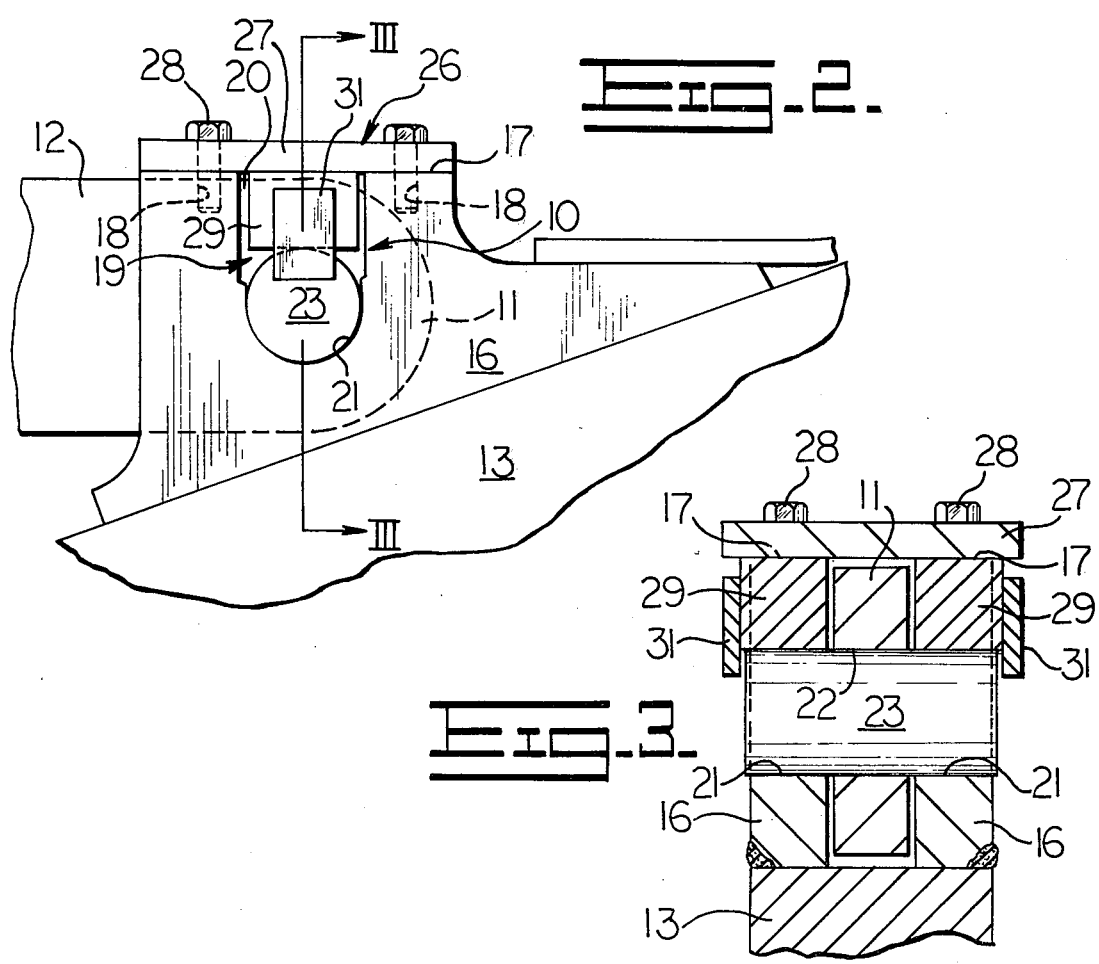

FORCE TRANSMITTING CONNECTION

BACKGROUND OF THE INVENTION

Many pinned connections are employed to connect one member to another primarily to provide a relatively firm connecting joint and to utilize the high force transmitting capability inherent thereof with the pivoting capability provided thereby being os secondary importance. One such connection is disclosed in U.S. Pat. No. 3,434,738 issued to T. G. Campbell et al. on Mar. 25, 1969 wherein one end of the pull hook is connected to the scraper frame through a pinned joint. However, one of the problems experienced with such pinned joints is that the pin tends to seize in the bores over a period of time from rust and lack of movement and is difficult to remove when it becomes necessary to separate the pull hook from the scraper frame for servicing of other vehicular components. Disassembly of such a joint is accomplished by driving the pin axially from the bores and frequently the problem of removing the pin is worsened due to a lack of working space between the pinned connection and other components of the machine.

OBJECTS OF THE INVENTION

Accordingly, an object of this invention is to provide an improved force transmitting connection which provides for easy assembly and disassembly thereof.

Another object of this invention is to provide such an improved force transmitting connection which utilizes the force transmitting capability and firmness of a pinned joint without the occasional problem of having to drive the pin axially through the bores of the support structures during assembly and disassembly.

Another object of this invention is to provide an improved force transmitting connection of the character described which permits the manufacturing tolerances to be increased for easier alignment of the mating components as compared with a pin connection while providing the firmness of a pinned joint.

Other objects and advantages of the present invention will become more readily apparent upon reference to the accompanying drawings and following description.

BRIEF DESCRIPTION OF THE DRAWINGS

FIG. 1 is a side elevational view of a force transmitting connection embodying the principles of the present invention associated with a pull hook of an earthmoving scraper.

FIG. 2 is a somewhat enlarged side elevational view of the force transmitting connection.

FIG. 3 is a vertical sectional view taken along line III—III of FIG. 2

DESCRIPTION OF THE PREFERRED EMBODIMENT

Referring to the drawings, a force transmitting connection embodying the principles of the present invention is generally indicated by the reference numeral 10 for connecting a forward end portion 11 of a pull hook 12 to a rearwardly extending framework 13 of an earthmoving scraper partially shown at 14. The rearward end of the pull hook is suitably attached to the rearward end of the framework by the usual bolt and shear block type of connection.

The force transmitting connection includes a pair of spaced upwardly extending brackets 16 secured to the framework as by welding or the like. Each of the brackets has an upper surface 17 and a pair of threaded holes 18 formed therein extending downwardly from the upper surface. An open-ended substantially U-shaped slot 19 is formed in each bracket and extends downwardly from the upper surface intermediate the threaded holes. Each slot has a throat 20 at the open end and terminates in a semicylindrical surface 21. The width of the throat is greater than the diameter of the semicylindrical surface.

The end portion 11 of the pull hook 12 extends between the brackets 16 and is provided with a laterally extending bore 22. A force transmitting pin 23 extends through the bore with a slip fit provided between the pin and the bore. The pin has its ends intimately nexted within the semicylindrical surfaces 21 of the brackets. The diameter of the pin is slightly less than the diameter of the semicylindrical surfaces with the difference being determined by the degree of firmness desired.

A fabricated retainer member 26 includes a plate 27 which bridges the brackets 16 and the space between the brackets and is removably secured to the upper surface 17 of the brackets by a plurality of bolts 28 screw threaded into the threaded holes 18. A pair of spaced lugs 29 are secured to and project downwardly from the plate into the throats 20 of the U-shaped slots 19 at opposite sides of the end portion 11 of the pull hook 12 and are in engagement with the pin 23 for clamping the pin within the semicylindrical surfaces 21. A pair of bars 31 are individually secured to the outer surface of each lug 29. The lower end of each bar extends below the lowest extremity of the lug and is disposed adjacent to the respective end of the pin for maintaining the pin between the bars.

To assemble the force transmitting connection 10 of the present invention, the force transmitting pin 23 is first inserted into the bore 22 of the end portion 11 of the pull hook. The pull hook is then positioned with the pin above the brackets 16 and in substantial alignment with the U-shaped slots 19. The pull hook is lowered so that the end portion goes between the brackets and the pin enters the throat 20 of the U-shaped slots with the pin eventually coming to rest in the semicylindrical surfaces 21 of the slots. The throats of the slots serve as a guide for directing the pin into the semicylindrical surfaces. The retainer member 26 is then secured in place to retain the pin within the U-shaped slots and thus connect the end portion of the pull hook to the brackets.

In the assembled position shown, the pull hook 12 is employed to pull a trailing earthmoving scraper, not shown, so that the available power from both vehicles is utilized in loading the trailing scraper. In so doing a pull force is transmitted through the force transmitting connection 10 from the framework 13 to the pull hook. Such force is normally transmitted in a direction substantially normal to the axis of the U-shaped slots 19 so that a majority of the force is transmitted directly from the pin 23 to the brackets 16 with only a minimal amount of force exerted against the retainer member 26 and thus the bolts 28.

In view of the foregoing, it is readily apparent that the structure of the present invention provides an improved force transmitting connection for connecting one member to another and which utilizes the force transmitting capabilities and firmness of a pinned joint and is easy to assemble and disassemble. This is accomplished by providing a pair of U-shaped open-ended slots in a pair of brackets with the slots adapted to receive the ends of a pin which is preinserted into a bore of the pull hook and is inserted into the slots by radial movement of the pin. The pin is then retained within the slots by a retainer member bolted to the bracket. Thus, to disassemble the connection, the bolts and the retainer member are removed thereby permitting the pin and the end of the pull hook to be separated from the brackets. Of course, it is assumed that the rearward end of the pull hook has already been disconnected in the usual manner.

While the invention has been described and shown with particular reference to the preferred embodiment, it will be apparent that variation might be possible that would fall within the scope of the present invention, which is not intended to be limited except as defined in the following claims.

What is claimed is:

1. A force transmitting connection for interconnecting a pair of members to transmit force therebetween, comprising:
    bracket means secured to one of the members including a pair of spaced apart brackets disposed on opposite sides of the other member, each of the brackets having an open-ended substantially U-shaped slot formed therein;
    force transmitting means connected to and projecting outwardly from opposite sides of the other member and nested within the U-shaped slots; and
    retainer means bridging the space between the brackets and removably secured thereto, said retainer means having a pair of spaced projections disposed on opposite sides of the other member and embracing the force transmitting means to retain the force transmitting means within the slots.

2. The force transmitting connection of claim 1 wherein said retainer means includes a pair of bars operative to retain the force transmitting means therebetween to limit lateral movement of the force transmitting means.

3. The force transmitting connection of claim 2 including means forming a bore in the other member and wherein said force transmitting means is a pin extending through the bore.

4. The force transmitting connection of claim 3 wherein said retainer means includes a plate removably secured to the brackets, the projections being nonremovable rigidly secured to the plate.

5. The force transmitting connection of claim 4 wherein said pair of bars are individually secured to the projections of the retainer means and are disposed adjacent to the opposite ends of the pin for retaining the pin therebetween.

6. The force transmitting connection of claim 5 wherein each slot has a semicylindrical surface for intimately receiving the pin and a throat having a width greater than the diameter of the semicylindrical surface for guiding the pin into the semicylindrical surface.

* * * * *